Patented May 20, 1930

1,759,279

UNITED STATES PATENT OFFICE

JULES ALFRED ROGNON, OF LEVALLOIS PERRET, FRANCE

MATERIAL FOR THE LOW-TEMPERATURE SOLDERING OF METALS

No Drawing. Application filed July 20, 1929, Serial No. 379,883, and in France July 24, 1928.

This invention has for its object the production of an improved material intended for the low-temperature soldering of all kinds of metals and more particularly of aluminum and its derivates.

The improved material consists primarily of a mixture of zinc chloride and borax, which may be complemented by the addition thereto of such bromides as sodium, aluminum or even ammonium bromide either separately or in mixtures. The optional admixture of a bromide allows the mechanical strength of the finished work and the melting point of the solder to be set at the desired value dependent upon the uses contemplated.

The zinc chloride and the borax, with or without an addition of bromides, are mixed in the cold, preferably in an enamelled stoneware container. The constituents must be in a finely pulverized state and, moreover, the operation must be carried out very rapidly. The product, as soon as obtained, must be put into a container made of such chemically resistant material as glass and provided with a tightly fitting closure to avoid any alteration of the product which is of very hygrometric character.

The proportions of the individual constituents of the mixture may be varied; however, the following analysis has been found to give good results, the parts being given in percentages by weight:—

| | |
|---|---|
| Borax | 18 |
| Zinc chloride | 40 |
| Sodium bromide | 34 |
| Aluminum or ammonium bromide | 8 |
| | 100 |

A product is thus obtained which allows soldering to be carried on at low temperature (about 95° C.), that is, by using a blow-pipe, a small gas-torch, a spirit torch or even a mere candle, no preparation or cleaning of any kind of either part to be soldered being necessary. It is even unnecesary that a very accurate fitting be provided between the parts to be connected; in all cases, a soldered joint is obtained the mechanical strength of which is equal to that of a solid part. Furthermore, the operation is of very short duration (20 to 30 seconds); and as soon as it is completed, the parts may be cooled down rapidly by contact with water and passed along to be machined.

I claim as my invention:

A composition for the low-temperature soldering of metals, comprising a mixture of borax, 18%; zinc chloride, 40%; sodium bromide, 34%; and aluminum bromide, 8%, the aforesaid percentages being by weight.

In testimony whereof, I affix my signature.

JULES ALFRED ROGNON.